US005447770A

United States Patent [19]

Smith

[11] Patent Number: 5,447,770

[45] Date of Patent: Sep. 5, 1995

[54] KIT AND METHOD FOR MAKING DECORATIVE ARTICLES

[76] Inventor: Ronald L. Smith, 737 Dunnway, Placentia, Calif. 92670

[21] Appl. No.: 168,586

[22] Filed: Dec. 2, 1993

[51] Int. Cl.⁶ ........................ B05D 1/14; B32B 33/00; A46D 1/00; G09B 19/00

[52] U.S. Cl. ........................................ 428/90; 428/92; 428/95; 156/72; 206/575; 434/95

[58] Field of Search ............... 428/90, 92, 95; 434/95; 206/575; 156/72

[56] References Cited

U.S. PATENT DOCUMENTS

| | | | |
|---|---|---|---|
| 2,435,068 | 1/1948 | Bellamy . | |
| 2,809,909 | 10/1957 | Chatanay | 428/92 |
| 3,285,797 | 11/1966 | Harrison . | |
| 3,570,435 | 3/1971 | Morrison . | |
| 4,310,313 | 1/1982 | Brundige . | |
| 4,355,722 | 10/1982 | Lemmeyer . | |
| 4,911,773 | 3/2790 | Leighton | 428/90 |
| 4,917,745 | 4/1990 | Speer | 428/90 |

*Primary Examiner*—George F. Lesmes
*Assistant Examiner*—Terrel Morris
*Attorney, Agent, or Firm*—Lowe, Price, LeBlanc & Becker

[57] ABSTRACT

A kit for making a decorative article includes a fabric backing having a grid thereon. The grid is sized in predetermined segments to facilitate making a decorative article therefrom. A plurality of differently colored yarn segments and a liquid adhesive are provided with a template showing the decorative article design. In use, one end of each of the yarn segments is adhesively attached to a square within the predetermined segments on the fabric backing. The yarn segments are attached to the fabric backing by following a key in conjunction with the template which has a corresponding grid printed thereon. A decorative article can be produced from the yarn segments which is adaptable for wall or floor use.

17 Claims, 2 Drawing Sheets

10

KIT AND METHOD FOR MAKING DECORATIVE ARTICLES

FIELD OF THE INVENTION

The present invention is directed to a kit and a method for making decorative articles, in particular, to the use of a kit including a fabric grid, a multicolored template, yarn segments and an adhesive wherein the yarn segments are adhesively applied to the fabric grid according to the multicolored template.

BACKGROUND ART

It is known in the prior art to make decorative articles through the use of templates. U.S. Pat. No. 4,355,722 to Lemmeyer discloses a yarn coloring picture set and a method of coloring. In this patent, a picture receiving board is provided having an adhesive layer coated thereon. Sections of yarn are applied to the adhesive layer using a yarn pencil.

U.S. Pat. No. 3,570,435 to Morrison discloses a method of making decorative articles employing yarn utilizing a base having a piercable elastic surface and a penetratable yieldable interior. Free ends of a yarn strand are pushed into the base in accordance with the picture thereon.

U.S. Pat. No. 2,435,068 to Bellamy discloses a method of knitting design wherein the design of the knitted article is determined by knitting in succession units which may contain yarns of various characteristics such as color.

It is also known to provide a kit for craft use. U.S. Pat. No. 4,310,313 to Brundige discloses a needleworking kit which includes a graph marked in colors to indicate where stitches are to be made on the grid of a canvas. The kit also includes instructions, one or more needles of the type required for needlepoint design and a supply of yarns in colors called for by the design.

In the manufacture of carpet, U.S. Pat. No. 3,285,797 to Harrison et al discloses a novel carpet construction wherein individual pile tufts extend through a backing fabric. The pile tufts are attached to the backing fabric using an adhesive and, optionally, a fusion treatment.

The aforementioned prior art has significant drawbacks in conjunction with kits and methods for making decorative articles. For example, the patents to Brundige, Morrison and Lemmeyer require the use of tools such as needles or other elongated implements for completing the decorative article. These tools require dexterity by a user and the ability to align the tool with a given pattern or form. Moreover, prior art patterns or templates also require complicated attachment features such as the perforated bases disclosed in the Morrison and Lemmeyer patents.

As such, a need has developed to provide a kit and a method for making decorative articles which is both simple in its design but effective in producing a finished product and which avoids complicated tools and/or patterns to facilitate attachment of yarn-like material.

In response to this need, the present invention provides an improved kit and method for making decorative articles which is simple to use but provides a highly detailed decorative article for rug, tapestry or other use.

SUMMARY OF THE INVENTION

Accordingly, it is a first object of the present invention to provide a kit and method for making a decorative article.

It is a further object of the present invention to provide a simple but effective kit and method for making a decorative article which includes the combination of a fabric grid in conjunction with a corresponding color template, yarn segments and an adhesive for producing the decorative article.

It is another object of the present invention to provide a kit and method for making a decorative article which eliminates the need for tools or implements and a high level of dexterity.

Other objects and advantages of the present invention will become apparent as the description thereof proceeds.

In satisfaction of the foregoing objects and advantages, there is provided a kit for making a decorative article comprising a plurality of yarn segments, each of the yarn segments having a predetermined length, diameter and color. Also included is a fabric backing having a printed grid on one surface thereof. The printed grid includes a plurality of square segments, each square segment being made of a predetermined number of squares. A template is provided having another printed grid thereon which corresponds to the printed grid on the fabric backing. The template also has a multicolored design incorporated therewith. Means are provided for attaching an end of each of the yarn segments to a square on the fabric backing. Preferably, a liquid adhesive is used for attachment purposes.

The inventive method comprises the steps of providing a plurality of yarn segments of predetermined length, color and diameter and a fabric backing having a printed grid on one surface thereof. The printed grid includes a plurality of square segments, each square segment having a plurality of squares therein. A template is provided having another printed grid thereon which corresponds to the printed grid on the fabric backing. The decorative article is formed by attaching an end of each of the yarn segments to a given square on the printed grid of the fabric backing in accordance with the multicolored design on the printed grid of the template.

More preferably, the printed grids on the template and fabric backing including dividing lines identifying or separating each of the square segments to permit decorative article formation in steps corresponding to each square segment.

Preferably, the yarn segments are attached to the fabric backing by formation of a bead of liquid adhesive applied to the fabric backing followed by insertion of ends of the yarn segments therein.

More preferably, the square segments are divided into ten by ten squares to make it easier to follow the template pattern in conjunction with the fabric grid.

BRIEF DESCRIPTION OF DRAWINGS

Reference is now made to the drawings accompanying the invention wherein.

DESCRIPTION OF THE PREFERRED EMBODIMENTS

The present invention provide improvements over prior art kits and methods for making decorative articles in its simplicity and effectiveness for producing a design having a high level of definition. The inventive kit and method eliminate the need for tools or implements to form the decorative article such that the kit can be mastered by young and old without the need for exceptional dexterity by a user.

Through the use of a fabric backing having a grid thereon in conjunction with a colored template design having a grid corresponding to the fabric backing grid, decorative articles can be produced having an intricate combination of colors and patterns in a simple and uniform series of steps.

The inventive kit and method is adaptable for decorative articles which can be used as wall hangings, tapestries or floor coverings such as rugs or the like. The inventive kit and method is especially adaptable for retail use and is ideal for the home craftsperson.

Figure 1:
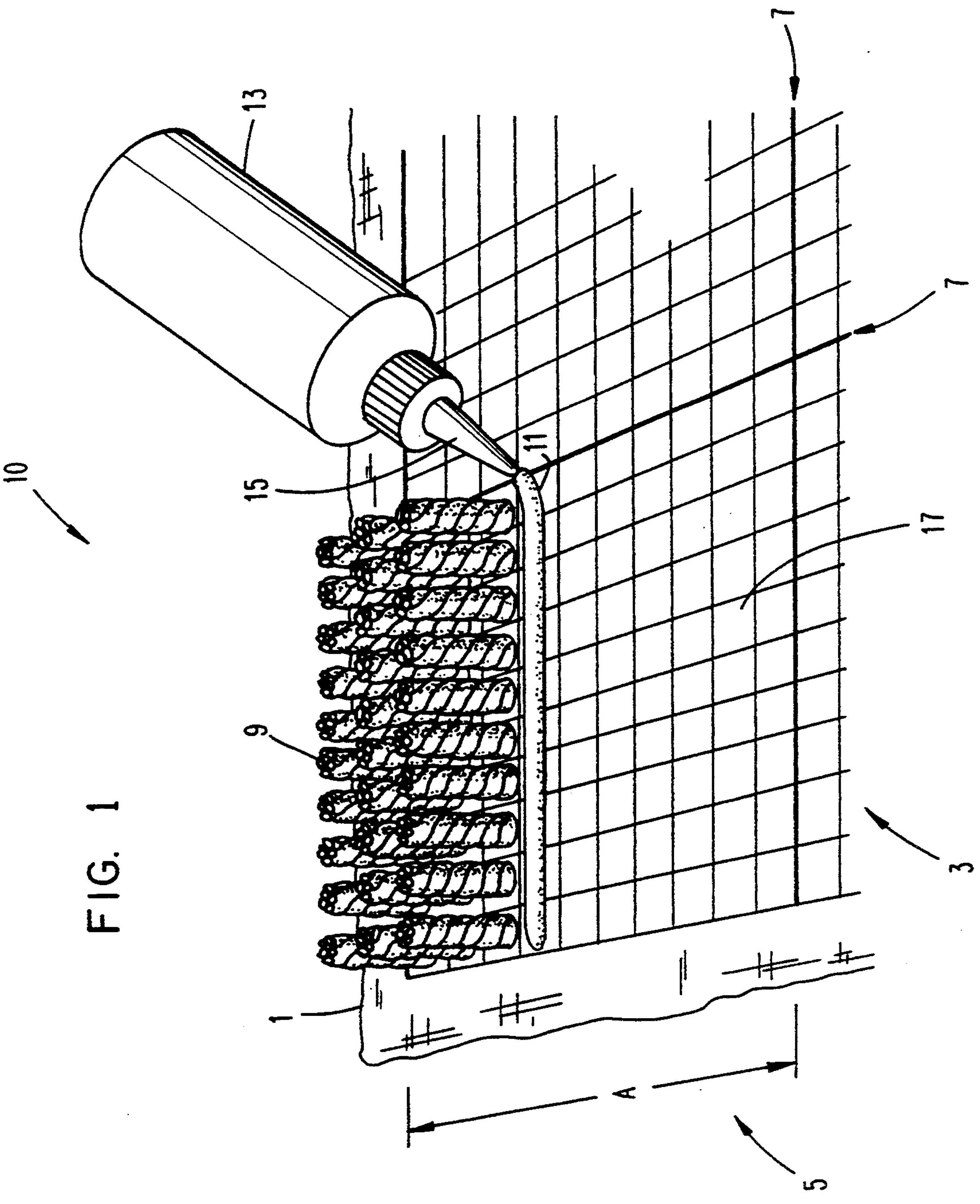
FIG. 1 is a perspective view of a portion of the inventive kit illustrating one step of the inventive process.

With reference now to FIG. 1, certain components of the invention are generally designated by the reference numeral 10. The inventive kit includes a fabric backing, a portion thereof designated by reference numeral 1, having a full scale grid pattern 3 printed thereon. Although the grid 3 may be printed on the fabric, the grid may be formed by weaving, embossing or other known methods in conjunction with the fabric backing so as to be integral part thereof.

Preferably, the grid 3 is arranged in square segments 5, one side thereof identified by the letter A. The square segments may be identified by dividing lines 7. These dividing lines, shown as a heavier lines in FIG. 1 than those making up the square segments 5, assist in stepwise formation of the decorative article. That is, following the pattern on the template, as will described hereinafter, in conjunction with each of the square segments 5 outlined by the dividing lines 7 reduces the tendency to lose track of correlating the template (not shown) with the printed grid 3 on the fabric backing 1. The dividing lines can also be made of a different color than lines forming the squares 17.

Still with reference to FIG. 1, three rows of yarn segments 9 are shown already attached to the fabric backing 1. Each yarn segment 9 is attached in the following manner. First, a bead of adhesive 11 is applied to a row of squares 17 using the container 13 with the conical tip 15. The tip 15 should be sized in relation to the squares 17 to facilitate bead application in a desired square or row.

After the bead of adhesive 11 is applied, each end of a yarn segment 9 is inserted into the bead 11 on a respective square until the entire row of ten squares is completed. This sequence of processing steps is continued until each square 17 of the grid 3 includes a respective yarn segment therewith. The free ends of the yarn segments form the desired color and design for the decorative article.

Figure 2:
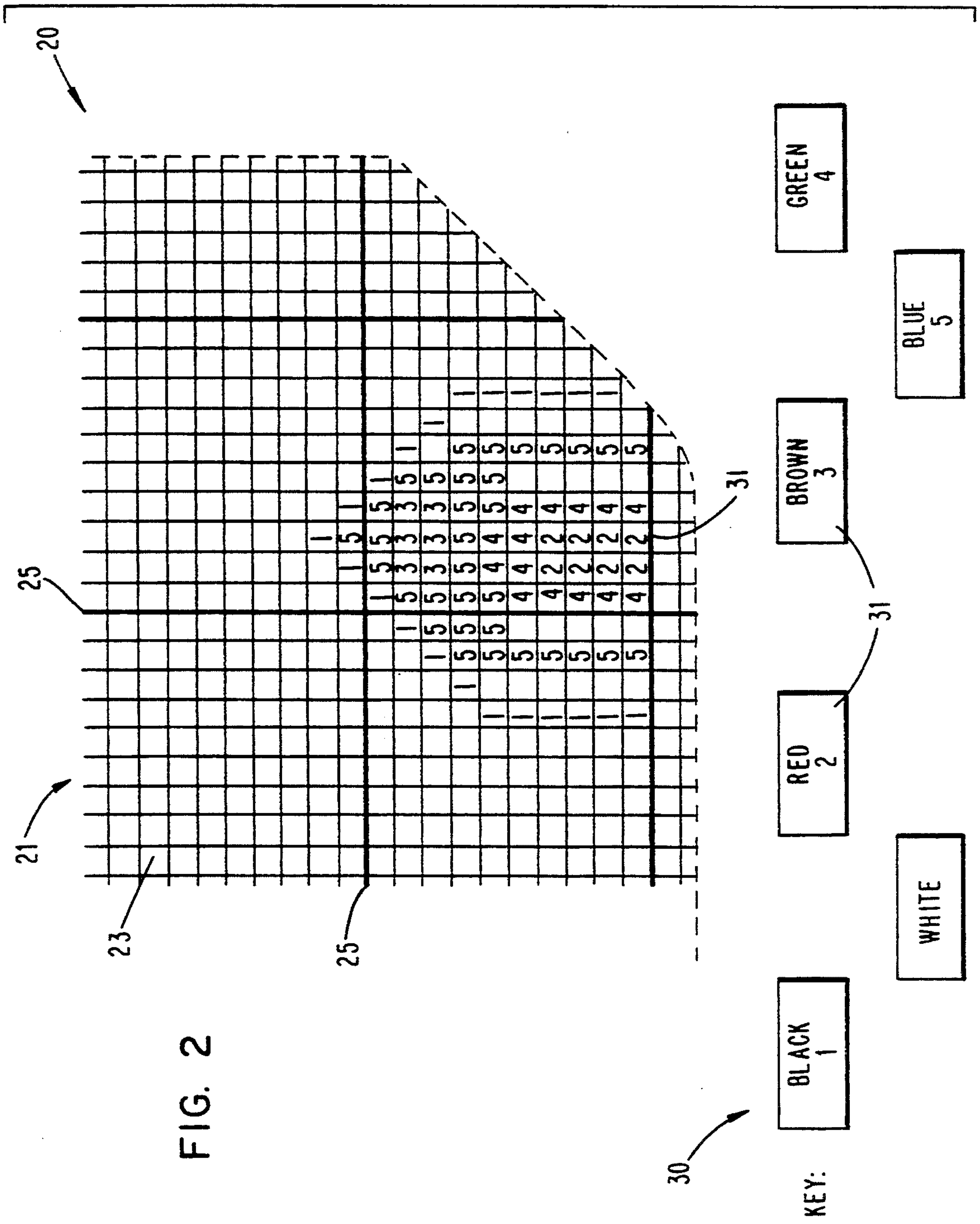
FIG. 2 is a representation of a portion of a template for use in the inventive kit and method.

With reference now to FIG. 2, a portion of an exemplary template is designated by the reference numeral 20 and is seen to include a plurality of square segments 21, each square segment including individual squares 23 therein. Square segments 21 are separated by dividing lines 25 which are heavier in nature than the lines identifying the individual squares 23.

In conjunction with the template 20, a key 30 is provided which correlates a given color with a particular numeral. The numerals 31 are associated with individual squares 23 to indicate which color yarn is to be associated with each square 23. For example, each square 23 in the template that is blank corresponds to a white yarn segment. Although the key 30 is shown in six different colors, each color having a respective indicia associated therewith, any number of colors and indicia may be used in conjunction with a design on the template 20. For example, each square segment 23 may be shaded in a color which corresponds to one of the colors shown in the key. In this embodiment, the yarn segment corresponding to the color of a given square 23 is attached thereto to ultimately form the finished decorative article.

The template 20 functions as an instruction sheet to make the decorative article. That is, the template 20 has a grid which corresponds, either in a one to one ratio or a different scale, to the grid printed on the fabric backing 1 shown in FIG. 1. Moreover, the dividing lines 25 on the template 20 are configured to match the dividing lines 7 on the grid 3 of the fabric backing 1. In this manner, a user can follow the color pattern on the template 20 in square segments of ten by ten and easily match the selected yarn segments 9 to the square segment 5 of the grid 3.

Although the square segments 5 of the grid 3 and square segments 21 of the template 20 are shown as ten by ten squares, any configuration for a segment may be utilized in conjunction with the inventive method and kit. Square segments of ten by ten squares are preferred since it is easier to finish the decorative article by applying the yarn segments in these size square segments.

The template 20 may be any size as long as it corresponds to the grid 3 of the fabric backing 1. Preferably, the template/fabric backing size ratio is about 1 to 4. That is, the individual squares 23 of the template are $\frac{1}{4}$ the size of the squares 17 on the grid 3. Further, the template may have any design thereon including animate or inanimate objects or the like.

Any type of liquid adhesive is adaptable for attaching the individual yarn segments 9 to the fabric backing 1. If the decorative article is designed for floor application, the liquid adhesive is preferably a washable type since these types of decorative articles may be subjected to dirt accumulation. If the decorative article is intended as a wall hanging, a non-washable type liquid adhesive may be utilized. Since these types of adhesives described above are considered to be well known in the prior art, further description thereof is not deemed necessary.

The yarn segments may be of any length, color and diameter, the length being such that the yarn segments will maintain a generally erect configuration when adhesively applied to the fabric backing. Preferably, the yarn segments are up to $1\frac{1}{2}$ inches in length with a diameter up to $\frac{1}{2}$ inch. More preferably, the yarn segments are $\frac{3}{4}$ inches long by $\frac{1}{4}$ inch in diameter.

Although not shown, the fabric backing could include a preapplied adhesive in conjunction with a removable covering. The removable covering could be sized to correspond to each square segment or each row of a square segment. In this manner, each removable covering can be selectively removed to facilitate yarn segment attachment. In use, the covering would be removed and yarn ends attached to the exposed adhesive. This sequencing would continue until the decorative article is formed.

The fabric backing 1 can be any known fabric capable of receiving the grid and adhesive as described above. The fabric backing can be cut in the final dimension or sized larger and trimmed after the decorative article is made.

In kit form, the invention includes the fabric backing with the printed grid thereon, the yarn segments in the appropriate colors to match the colors designated on the template, the template and key as an instruction sheet, the adhesive, preferably in a container with a conical tip and a container for holding the components in a compact manner. Preferably, the holding container would include a reproduction of the template design on the outside thereof to inform a potential user as to the decorative article to be made.

As such, an invention has been disclosed in terms of preferred embodiments thereof which fulfill each and every one of the objects of the present invention as set forth hereinabove and provide a new and improved kit and method for making a decorative article.

Various changes, modifications and alterations from the teachings of the present invention may be contemplated by those skilled in the art without departing from the intended spirit and scope thereof. Accordingly, it is intended that the present invention only be limited by the terms of the appended claims.

I claim:

1. A kit for making a decorative article comprising:
a) a plurality of yarn segments, each yarn segment having a predetermined length, diameter and color;
b) a piece of fabric backing having a first grid on one surface thereof; said first grid comprising a plurality of square segments, each square segment including a predetermined number of squares;
c) a template sheet having a second grid thereon which corresponds in layout to said first grid, said template sheet having a multicolored design incorporated with said second grid; and
d) means for attaching one end of each said yarn segment to of said piece of fabric backing by referring to said multicolored design on said template sheet to form said decorative article.

2. The kit of claim 1 wherein each of said first and second grids further include lines therein, said lines separating adjacent square segments.

3. The kit of claim 2 wherein each said line has a color different than a color of either of said first or second grids.

4. The kit of claim 1 wherein said means for attaching comprises a liquid adhesive in a container, said container including means for applying said adhesive to at least one of said predetermined number of squares at a time.

5. The kit of claim 4 wherein said means for applying includes a conical tip having a tip end sized to correspond to each of said predetermined number of squares.

6. A kit of claim 1 wherein each said yarn segment ranges up to 1½ inches in length and ½ inch in diameter.

7. The kit of claim 6 wherein each said yarn segment is ¾ inch long and ¼ inch in diameter.

8. The kit of claim 1 wherein each of said plurality of square segments comprises one hundred squares.

9. The kit of claim 1 wherein said first grid is four times as large in layout as said second grid.

10. A method of making a decorative article comprising the steps of:
a) providing a plurality of yarn segments of predetermined length, color and diameter;
b) providing a piece of fabric backing having a first grid on one surface thereof, said first grid comprising a plurality of square segments, each square segment including a predetermined number of squares;
c) providing a template sheet having a second grid thereon which corresponds to said first grid, said template sheet having a multicolored design incorporated with said second grid; and
d) adhesively attaching one end of each said yarn segments to each of said predetermined number of squares of said first grid by referring to said multicolored design of said second grid on said template sheet to form said decorative article.

11. The method of claim 10 further comprising the steps of:
a) providing a plurality of dividing lines on said first and second grids, each of said dividing lines separating adjacent square segments; and
b) adhesively attaching said yarn segments to said square segments separated by said dividing lines.

12. The method of claim 10 wherein said adhesively attaching step comprises applying a bead of a liquid adhesive on said predetermined number of squares located in one of said plurality of square segments and inserting said ends of said yarn segments into said liquid adhesive to attach said yarn segments to said piece of fabric backing.

13. The method of claim 11 wherein said adhesively attaching step comprises applying a bead of a liquid adhesive on said predetermined number of squares located in one of said plurality of square segments and inserting said ends of said yarn segments into said liquid adhesive to attach said yarn segments to said piece of fabric backing.

14. The method of claim 12 wherein said step of providing a piece of fabric backing further comprises providing said first grid with square segments of one hundred squares.

15. The method of claim 13 wherein said step of providing a piece of fabric backing further comprises providing said first grid with square segments of one hundred squares.

16. The kit of claim 1 wherein said template sheet includes a key pattern thereon which provides correspondence between said multicolored design and colors of said yarn segments.

17. The method of claim 10 further comprising the steps of providing a key pattern on said template sheet, said key pattern showing correspondence between colors of said multicolored design and colors of said yarn segments and determining a color of each of said yarn segments to be attached to each of said predetermined number of squares of said piece of fabric backing using said key pattern.

* * * * *